(12) United States Patent
Faifer et al.

(10) Patent No.: US 12,312,032 B2
(45) Date of Patent: May 27, 2025

(54) BICYCLE HANDLEBAR ACCESSORY AND APPARATUS, AND METHOD OF STABILIZING AN INVERTED BICYCLE

(71) Applicants: Sagi Faifer, Mishmar Hashiva (IL); Guy Klipshtein, Givatayim (IL)

(72) Inventors: Sagi Faifer, Mishmar Hashiva (IL); Guy Klipshtein, Givatayim (IL)

( * ) Notice: Subject to any disclaimer, the term of this patent is extended or adjusted under 35 U.S.C. 154(b) by 562 days.

(21) Appl. No.: 17/666,502

(22) Filed: Feb. 7, 2022

(65) Prior Publication Data

US 2022/0250699 A1  Aug. 11, 2022

Related U.S. Application Data

(60) Provisional application No. 63/146,675, filed on Feb. 7, 2021.

(51) Int. Cl.
 *B62H 1/06* (2006.01)
 *B62K 21/16* (2006.01)

(52) U.S. Cl.
 CPC .............. *B62H 1/06* (2013.01); *B62K 21/16* (2013.01)

(58) Field of Classification Search
 CPC ........ B62K 21/16; B62K 21/125; B62J 23/00; B62H 1/06
 USPC ................................................ 280/293, 300
 See application file for complete search history.

(56) References Cited

U.S. PATENT DOCUMENTS

| 350,990 A | 10/1886 | Philbrick |
| 518,325 A | 4/1894 | Mueller |
| 519,016 A | 5/1894 | De Clairmont |
| 574,628 A * | 1/1897 | Phillips ..................... B62H 3/00 211/20 |
| 589,643 A | 9/1897 | De Mers |
| 593,521 A | 11/1897 | Fowler |
| 2,696,389 A | 12/1954 | Cessford |
| 3,980,320 A | 9/1976 | Marchello |
| 4,846,353 A * | 7/1989 | Knight ..................... B62H 3/00 211/189 |
| 5,497,967 A | 3/1996 | Gantois |
| 5,524,450 A | 6/1996 | Terry |

(Continued)

FOREIGN PATENT DOCUMENTS

| EP | 3187404 A1 | 7/2017 |
| GB | 2500268 A | 9/2013 |

(Continued)

*Primary Examiner* — Anne Marie M Boehler
*Assistant Examiner* — Felicia L. Brittman-Alabi
(74) *Attorney, Agent, or Firm* — Law Office of Arthur M. Antonelli, PLLC

(57) ABSTRACT

A bicycle handlebar accessory (or bicycle pod) 20 is disclosed which may be secured in a bicycle handlebar tube 24 and arranged into a deployed configuration 500. A host bicycle 10 with a pair of bicycle pods 20 secured in opposite ends of the handlebar tube 24 may be inverted for inspection or repairs while the bicycle pods 20 stabilize the inverted bicycle and keep the handlebar 24 (and any accessories mounted thereon) spaced from the ground 26 and away from potentially hazardous materials and conditions, including water, ice, frozen or super-heated pavement, sand, gravel, or other surface hazards such as road salt or deicing chemicals. The disclosed bicycle pod 20 may include a main body 28, a distal shaft 30, a proximal shaft 32, and a coil spring 34.

20 Claims, 13 Drawing Sheets

(56) References Cited

U.S. PATENT DOCUMENTS

| | | |
|---|---|---|
| 6,561,058 B1 | 5/2003 | Steinke |
| 2009/0056495 A1 | 3/2009 | Bischoff et al. |
| 2021/0095812 A1* | 4/2021 | Wilkoff .................... B62H 1/06 |

FOREIGN PATENT DOCUMENTS

| | | |
|---|---|---|
| WO | WO 2009037140 A1 | 3/2009 |
| WO | WO 2015181554 A1 | 12/2015 |
| WO | WO 2019180500 A1 | 9/2019 |

* cited by examiner

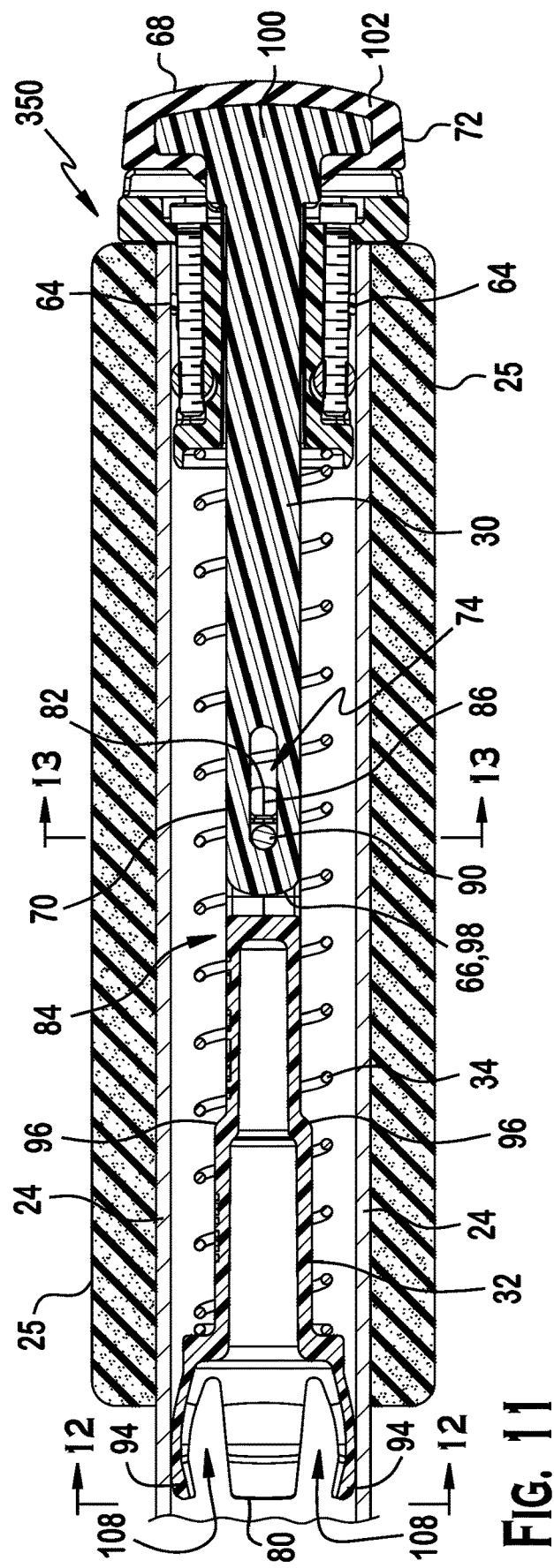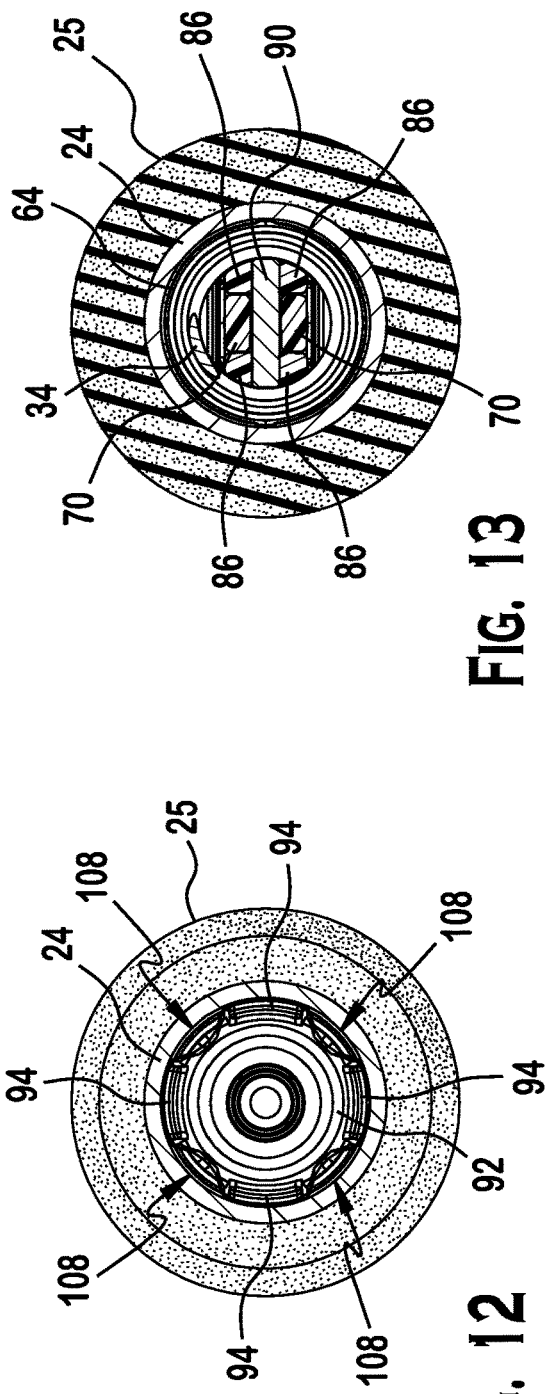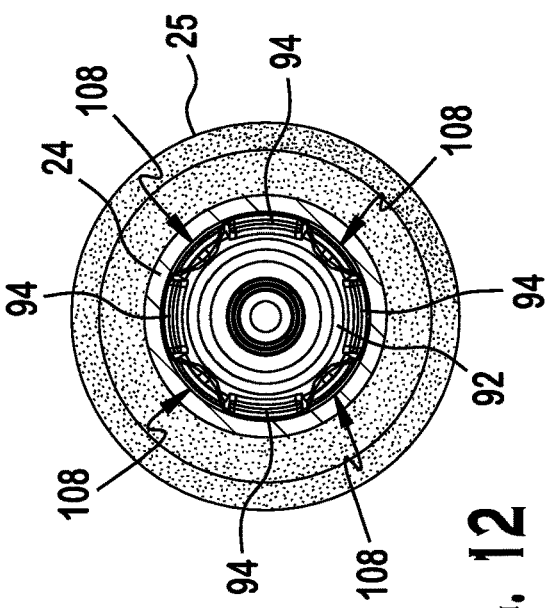
FIG. 11
FIG. 13
FIG. 12

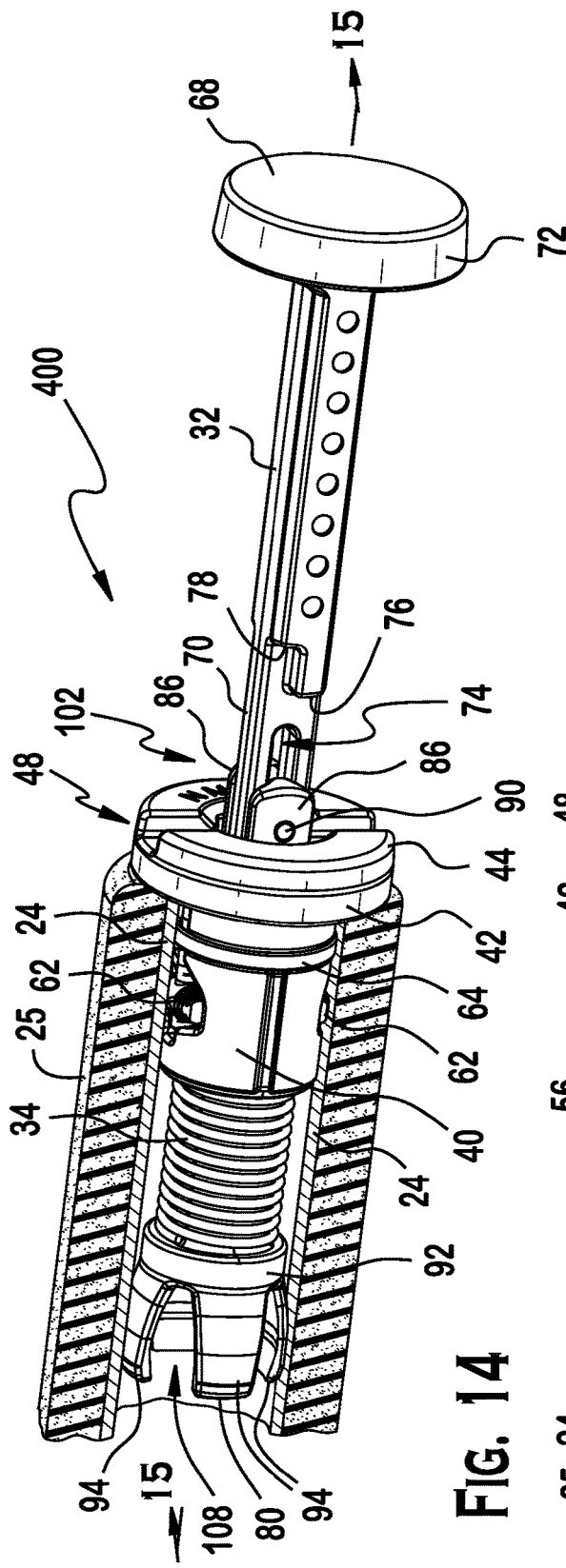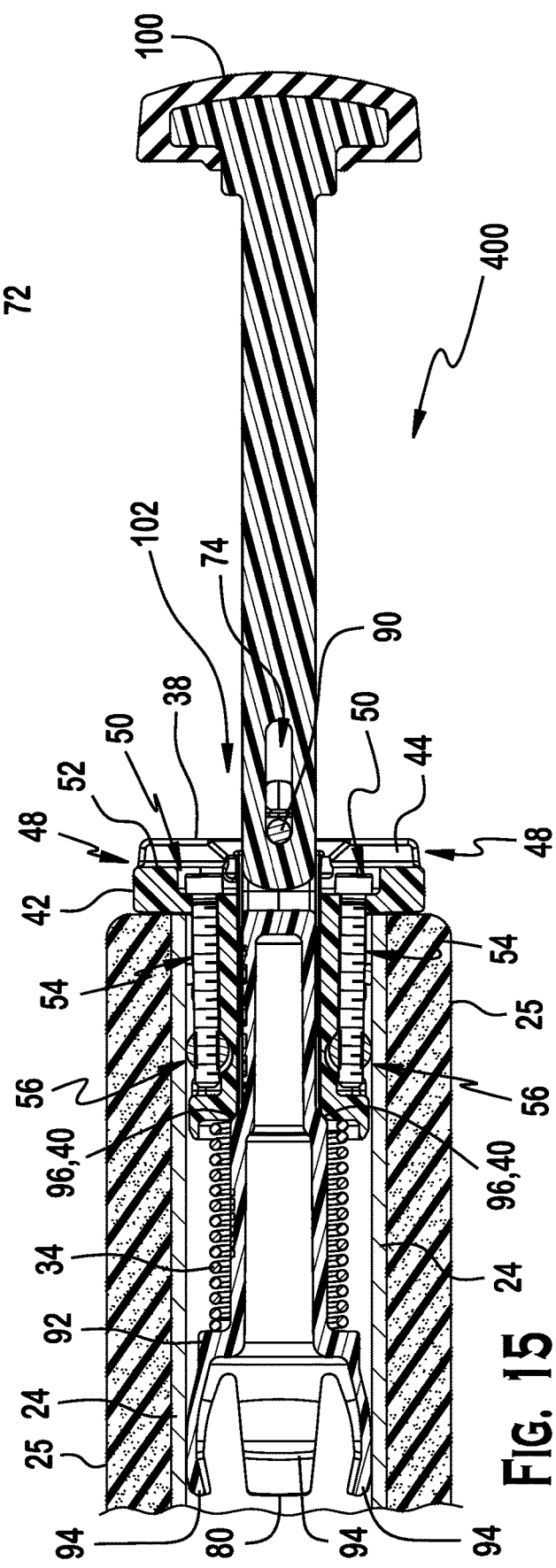

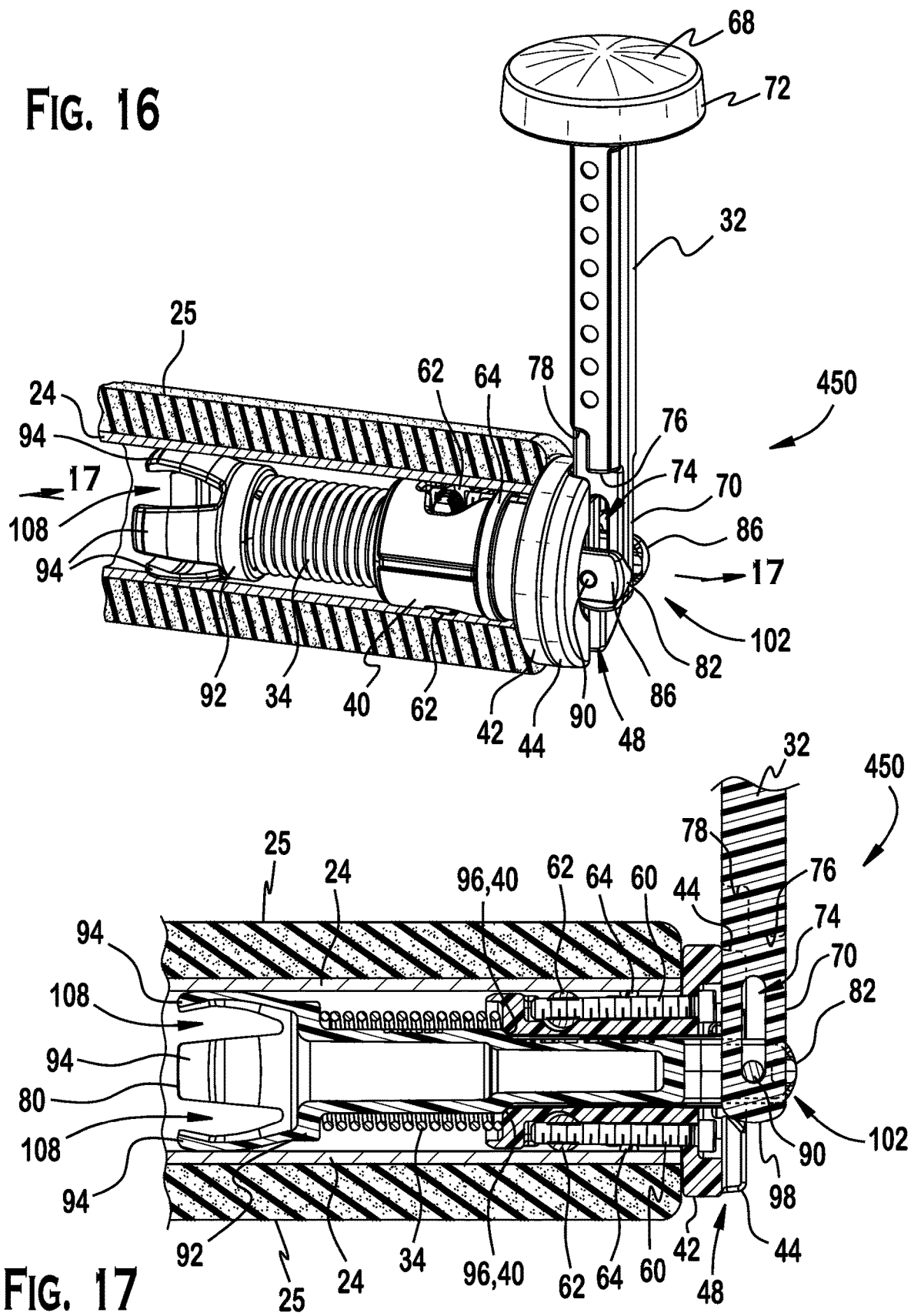

US 12,312,032 B2

BICYCLE HANDLEBAR ACCESSORY AND APPARATUS, AND METHOD OF STABILIZING AN INVERTED BICYCLE

CROSS REFERENCE TO RELATED APPLICATIONS

This application claims the benefit of U.S. Provisional Application No. 63/146,675 filed Feb. 7, 2021, which is incorporated by reference herein in its entirety.

FIELD OF THE INVENTION

The invention generally relates to a bicycle handlebar accessory. More particularly, the invention relates to a bicycle pod, bipod apparatus, and method for stabilizing an inverted bicycle.

BACKGROUND

Bicycle repair stands are known in the related art. These devices may be used to hold a bicycle for repairs or inspections. Generally, these stands may be wall mounted, bench mounted, or free standing structures that hold a bicycle for storage, maintenance, or repair. Bicycle repair stands, however, may be inconvenient or impractical to stow or carry during use of the bicycle.

SUMMARY

The present invention is directed toward a bicycle handlebar accessory that may be deployed to help stabilize an inverted bicycle for inspection or repairs.

DESCRIPTION OF THE DRAWINGS

In the accompanying drawings, which form part of this specification and are to be read in conjunction therewith and in which like reference numerals are used to indicate like parts in the various views:

FIG. 11 is a cross-sectional view of the handlebar accessory of FIG. 9 along line 11-11;

FIG. 12 is a cross-sectional view of the handlebar accessory of FIG. 11 along line 12-12;

FIG. 13 is a cross-sectional view of the handlebar accessory of FIG. 11 along line 13-13;

FIG. 14 is another view of FIG. 7 showing the handlebar accessory in an extended configuration;

FIG. 15 is a cross-sectional view of the handlebar accessory of FIG. 14 along line 15-15;

FIG. 16 is another view of FIG. 7 showing the handlebar accessory in articulated configuration;

FIG. 17 is a cross-sectional view of the handlebar accessory of FIG. 16 along line 16-16;

DESCRIPTION

Figure 1:
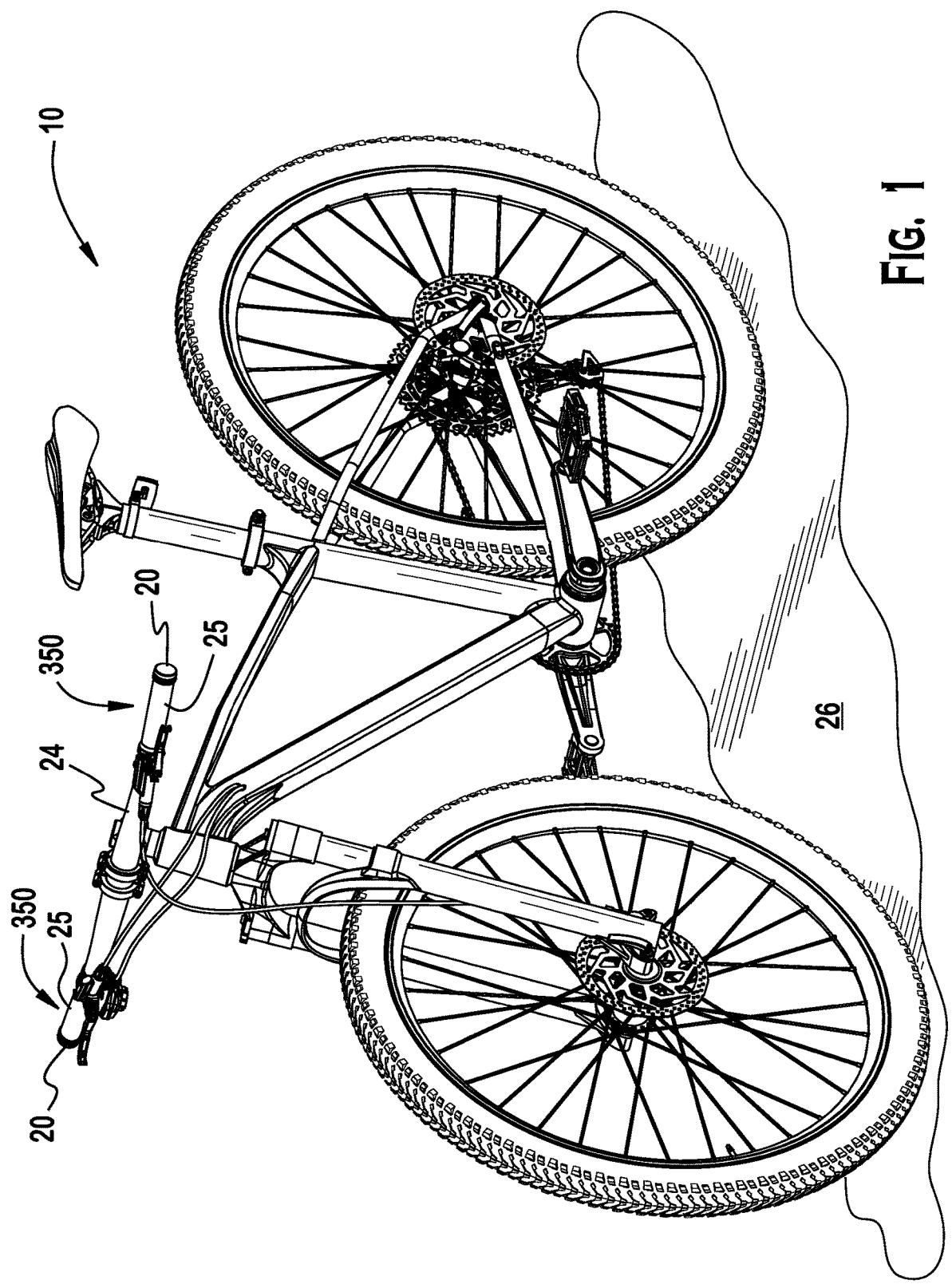
FIG. 1 is a perspective view of a bicycle and an exemplary embodiment of a handlebar accessory.
Figure 2:
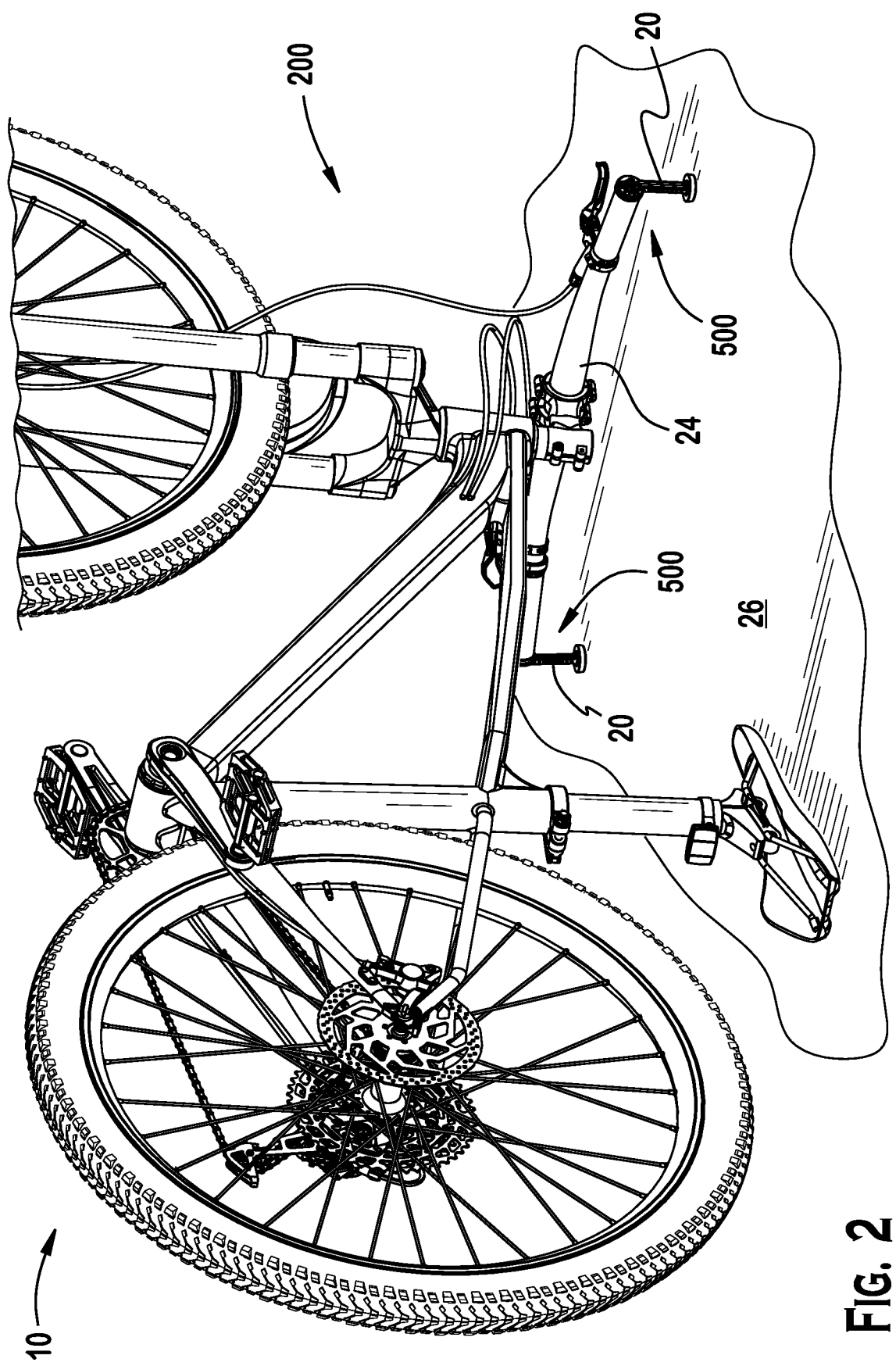
FIG. 2 is a perspective view of the handlebar accessory of FIG. 1 in a deployed configuration with the bicycle being inverted for inspection or repairs.
Figure 3:
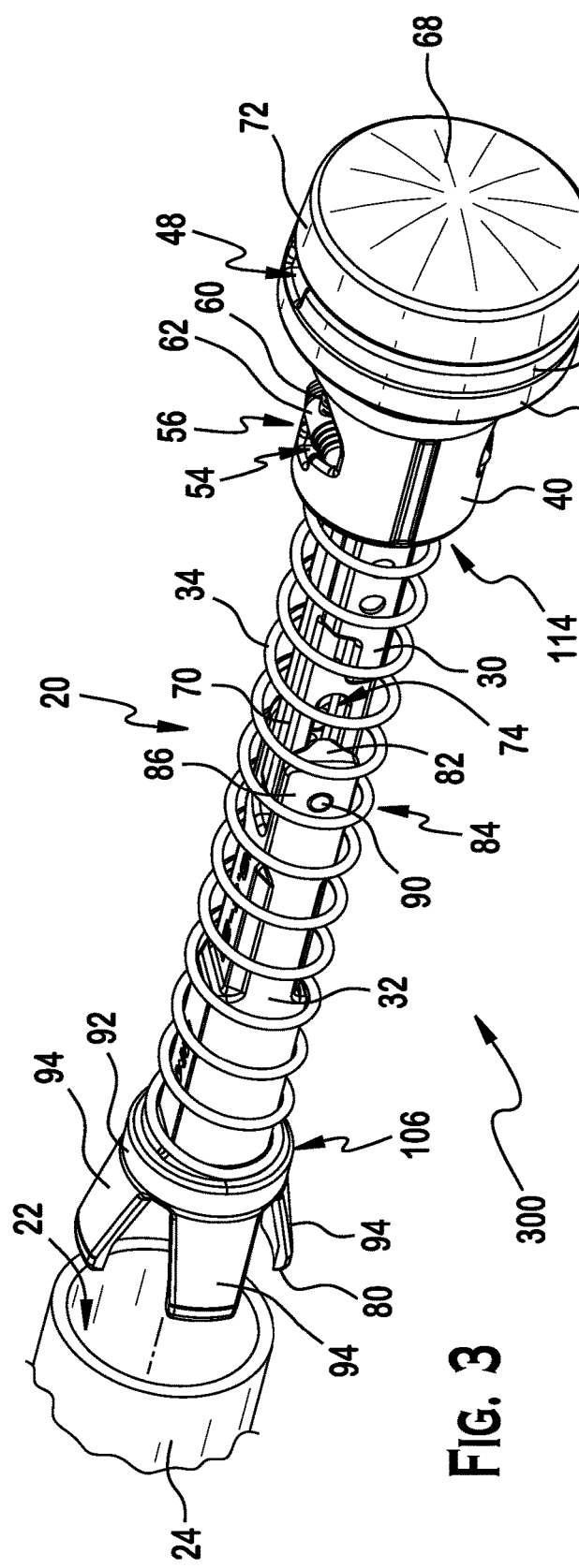
FIG. 3 is a perspective view of the handlebar accessory of FIG. 1.

FIG. 1 shows a perspective view of an illustrative bicycle 10 and an exemplary embodiment of a bicycle handlebar accessory (or bicycle pod) 20. As shown in FIG. 3, the bicycle handlebar accessory 20 may be arranged in an open end 22 of a handlebar tube 24. As shown in FIG. 2, the bicycle handlebar accessory (or bicycle pod) 20 may be positioned in a deployed configuration 500 in which the bicycle 20 may be inverted for inspection or repairs while keeping the handlebar 24 (and any accessories mounted thereon) and grip 25 spaced from the ground 26 and away from potentially hazardous materials and conditions, including water, ice, frozen or super-heated pavement, sand, gravel, or other surface hazards such as road salt or deicing chemicals.

Figure 22:
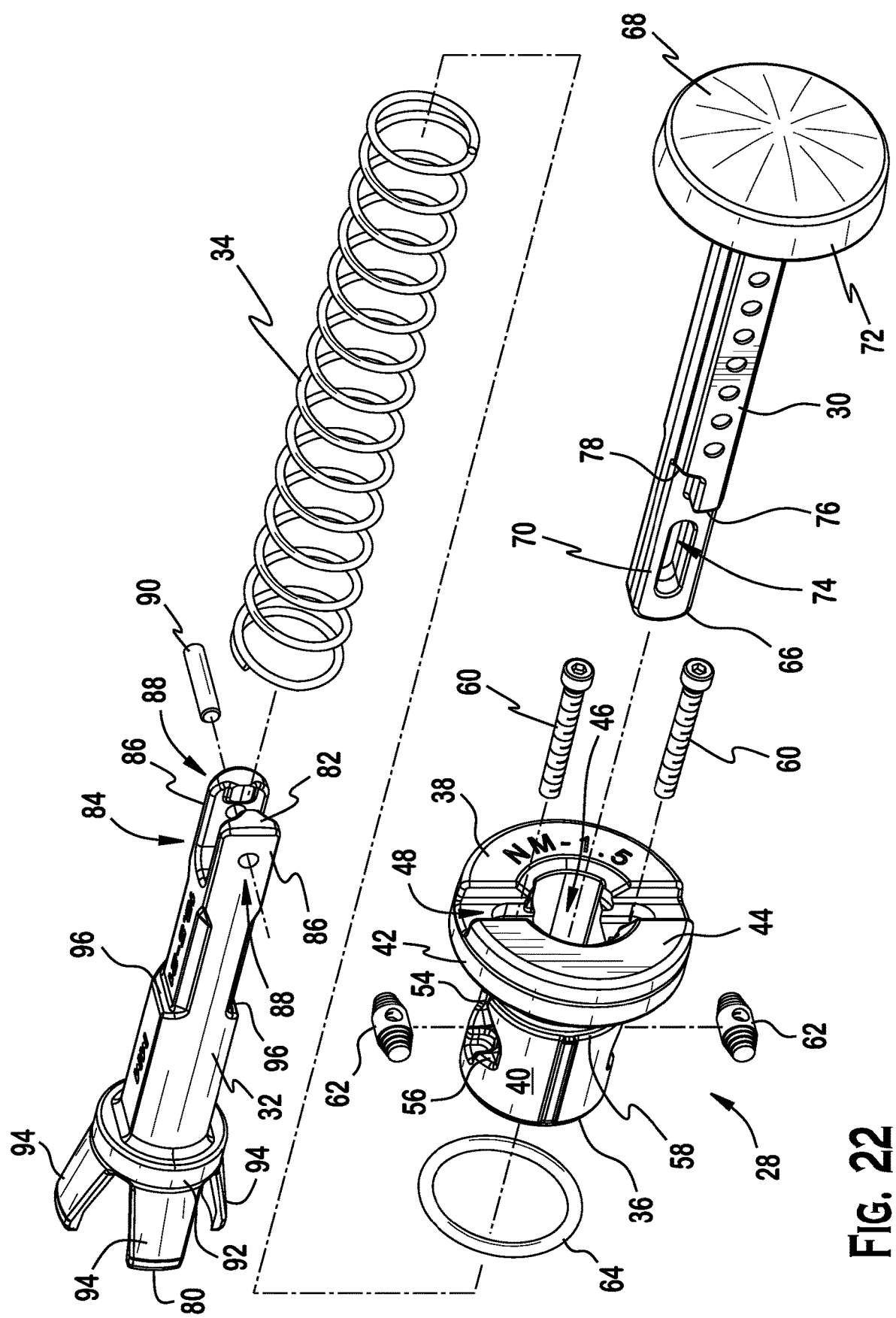
FIG. 22 is an exploded view of the handlebar accessory of FIG. 1.

Referring to FIG. 22, the bicycle handlebar accessory 20 may include a main body 28, a distal shaft 30, a proximal shaft 32, and a coil spring 34. The main body 28 may include a longitudinal axis, a proximal end 36, and a distal end 38 spaced from the proximal end along the longitudinal axis. The main body 28 also may include a plug 40, a flange 42, and a base (or gate) 44. Further, the main body 28 may include a passage 46 extending from the proximal end 36 to the distal end 38. The main body 28 further may include a notch 48. The notch 48 may possess a longitudinal axis which is perpendicular to the longitudinal axis of the main body. The passage 46 may bisect the notch 48. Referring to FIG. 15, the notch 48 may include a pair of fastener receiving bores 50 which extend from a distal face 52 of the notch 48 through the flange 42 and into a fastener recess 54 that is disposed on the plug. Each fastener recess 54 further may intersect an anchor recess 56 that is disposed on the plug. Referring to FIG. 22, the plug 40 further may include a circumferential groove 58. See also, FIG. 20. Additionally, the main body may include a pair of threaded fasteners 60, a pair of anchors (or rollers) 62, and an elastomeric seal (e.g., an O-ring) 64. See e.g., FIGS. 15 and 22.

Figure 19:
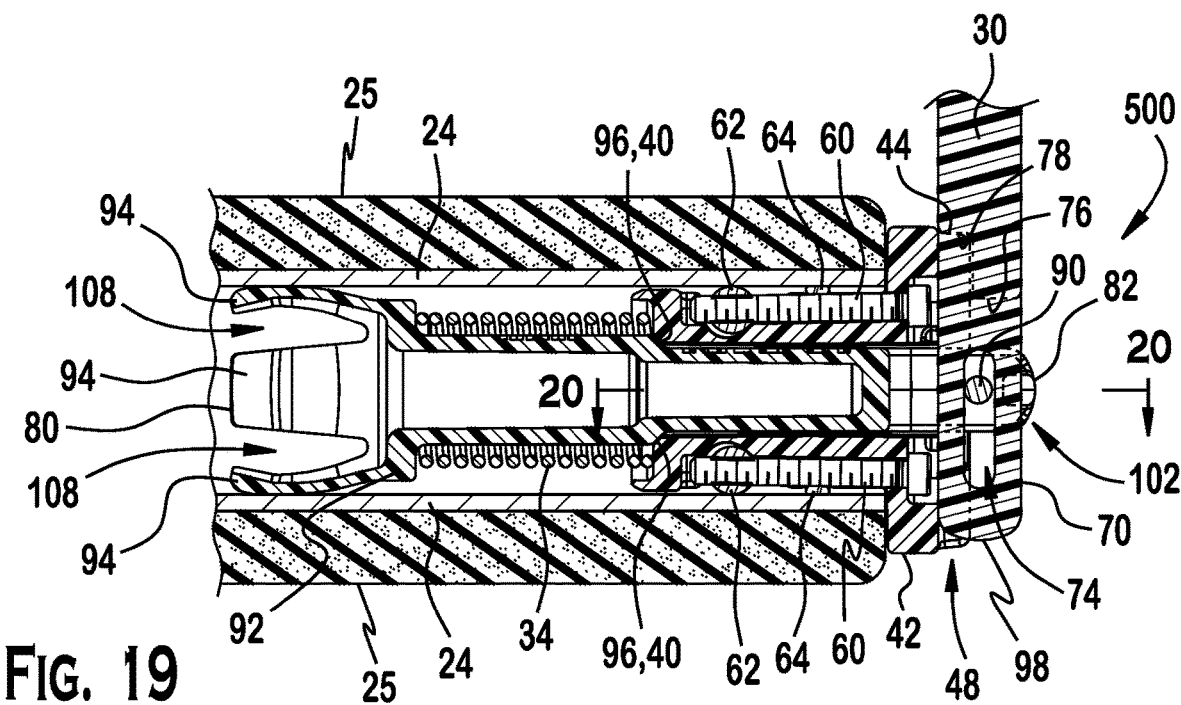
FIG. 19 is a cross-sectional view of the handlebar accessory of FIG. 18 along line 19-19.

The distal shaft 30 may include a longitudinal axis, a proximal end 66, and a distal end 68 spaced from the proximal end along the longitudinal axis. The distal shaft 30 may include a stem 70 at the proximal end 66 and a knob 72 at the distal end 68. The stem 70 may include an elongated slot 74. Additionally, the distal shaft 30 may include a lower shoulder 76 and an upper shoulder 78 adjacent to the stem 70. The proximal shaft 32 may include a longitudinal axis, a proximal end 80, and a distal end 82 spaced from the proximal end along the longitudinal axis. The distal end 82 of the proximal shaft 32 may include an eye structure 84. The eye structure 84 may include a pair of opposing arms 86 that each include a fastener receiving hole 88. The eye structure 84 may be configured and dimensioned to receive the stem 70. For example, the opposing pair of fastener receiving holes 88 may be aligned with the elongated slot 74 when the stem is positioned in the eye structure 86. See e.g., FIGS. 3, 4 and 10. Also, a hinge pin 90 may be arranged in the opposing pair of fastener receiving holes 88 and the elongated slot 74 to form a joint. See e.g., FIGS. 10, 14 and 17. The proximal end 80 of the proximal shaft 32 may include a carriage 92. The carriage 92 may include a plurality of resilient appendages (or leaves) 94. The proximal shaft 32 also may include a blocking shoulder 96 disposed between the carriage 92 and the eye structure 84. The blocking shoulder 96 may interface with the main body 28 to block or limit translational movement of the proximal shaft 32 through the passage 46. See e.g. FIGS. 15, 17 and 19.

Figure 10:
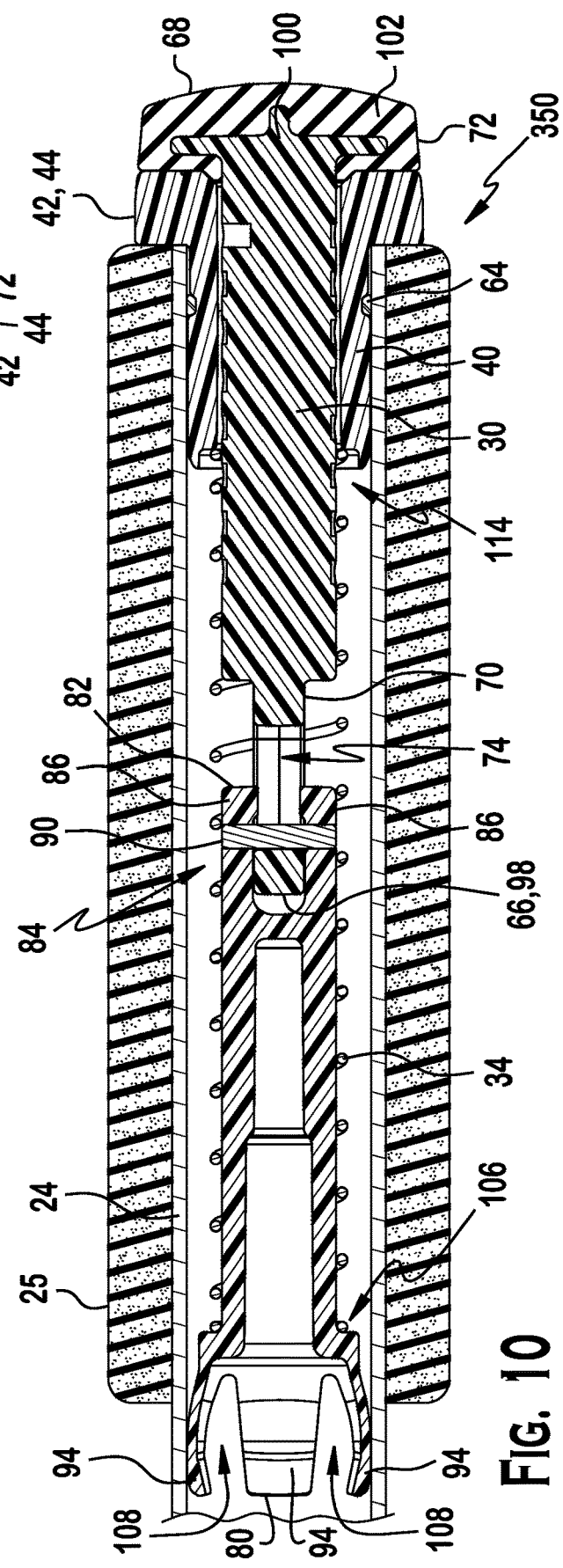
FIG. 10 is a cross-sectional view of the handlebar accessory of FIG. 9 along line 10-10.
Figure 18:
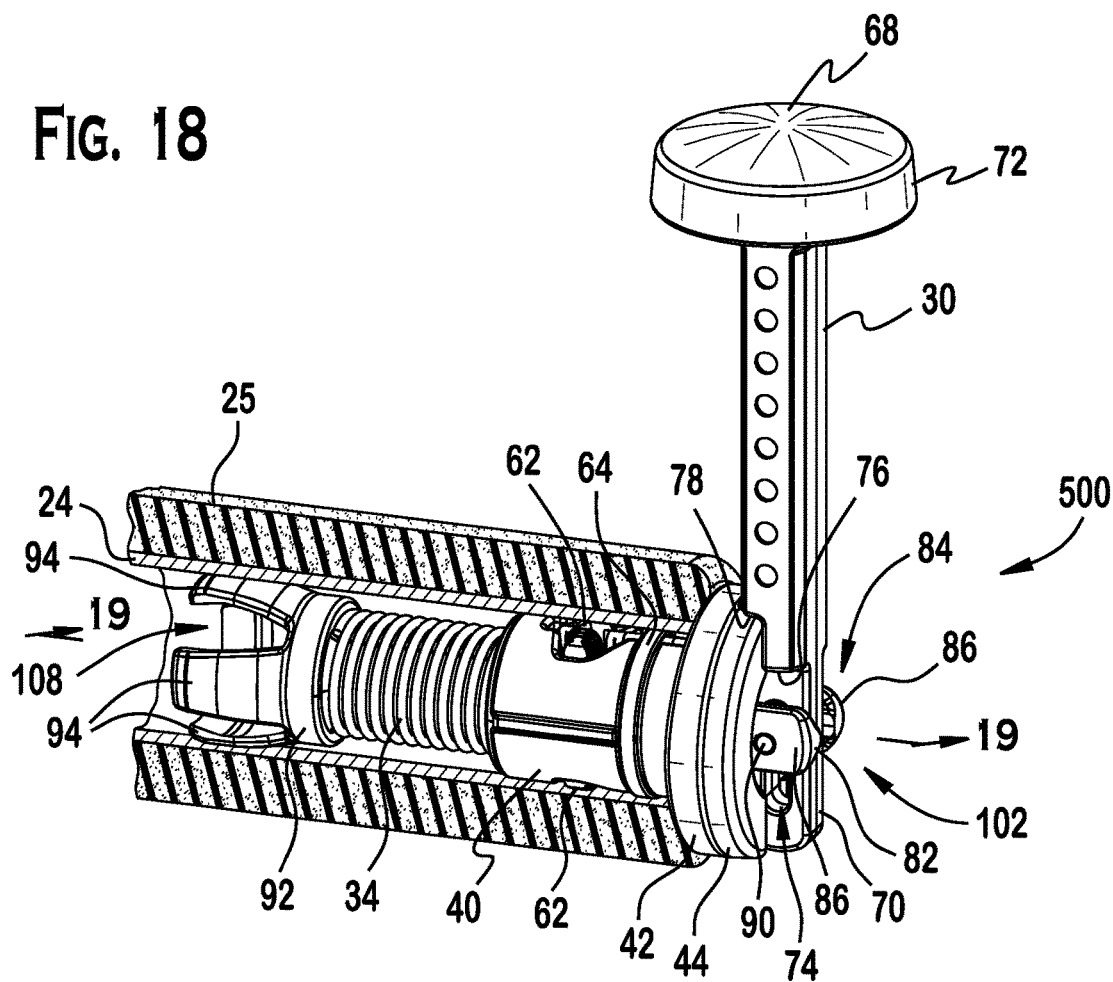
FIG. 18 is another view of FIG. 7 showing the handlebar accessory in a deployed configuration.

Referring to FIGS. 10 and 11, the distal shaft 30 may include a proximal end 66 and a distal end 68. The proximal end 66 may include a stem 70 and the distal end 68 may include a knob 72. Further, the proximal end 66 of the distal shaft 30 may include a curved tip 98, as well as a nearby elongated slot 74 which extends from one side (e.g., a starboard side) of the stem 70 to the opposite side (e.g., a port side). Further, the distal shaft 30 may include a lower shoulder 76 adjacent to the elongated slot 74 and an upper shoulder 78 spaced from the lower shoulder. See e.g., FIG. 22. Preferably, the distal end 68 may include a substrate 100 and an over molded material 102. For instance, a soft elastomer may be molded over a hard substrate to form an exterior portion of the knob 72 which provides a non-slip, grip.

Referring to FIGS. 3, 4, 10 and 22, the proximal shaft 32 may include a proximal end 80 and a distal end 82. The distal end 82 may include an eye structure 84. The eye structure 84 may be configured and dimensioned to receive and connect with the stem 70. For example, the eye structure 84 may include opposing fastener receiving holes 88 (see e.g., FIG. 22) and the stem 70 may be pinned in the eye structure 84 with a hinge pin 90 to form a joint 102 (see e.g., FIGS. 14-20). The proximal end 80 of the proximal shaft 32 may be spaced from the carriage 92. Generally, the carriage 92 may include a ring shaped portion and possess a circular cross-section immediately adjacent to the proximal shaft 30. The distal surface of the carriage 92 may form an annular base 106 surrounding the proximal shaft 30. The annular base 92 may form an inferior seat for the spring 32. By contrast, the proximal end of the carriage 92 may include a set of tapered appendages (or leaves) 94. The set of leaves 94 may be independently resilient and spaced uniformly around the carriage 92. Preferably, as shown in FIGS. 10-12, the carriage 92 may include four cantilevered leaves 94 which are separated by four intervening gaps 108. A different number of leaves 94 may be provided, however, as long as the leaves 94 cooperate to resiliently center and stabilize the position of the carriage 92 in the handlebar tube 24. For instance, the carriage 92 may include three leaves 94, and each leaf 94 may be positioned opposite a gap 108. Thus, each leaf 74 may be configured and dimensioned to flex toward each other resiliently and independently.

Figure 5:
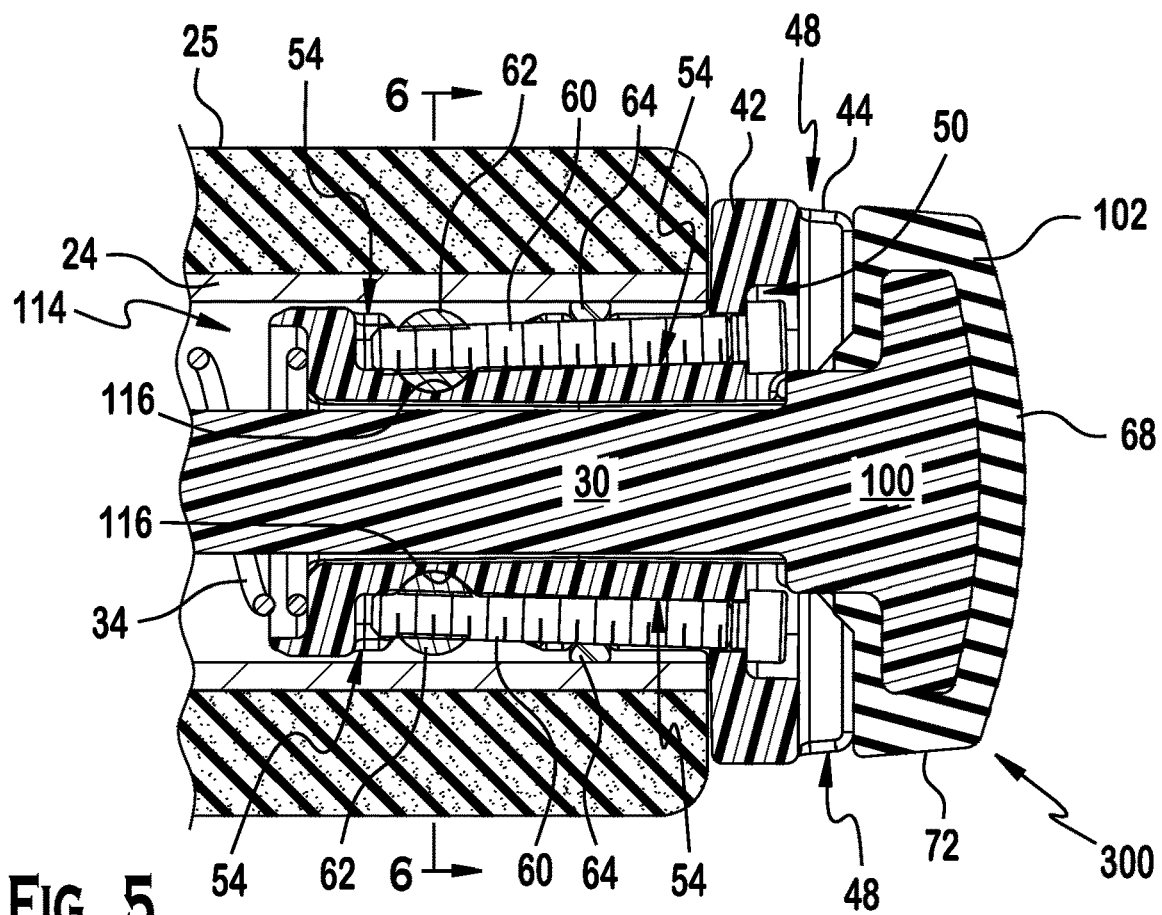
FIG. 5 is a cross-sectional view of the handlebar accessory of FIG. 4 along line 5-5, the handlebar accessory being in a ready configuration.
Figure 6:
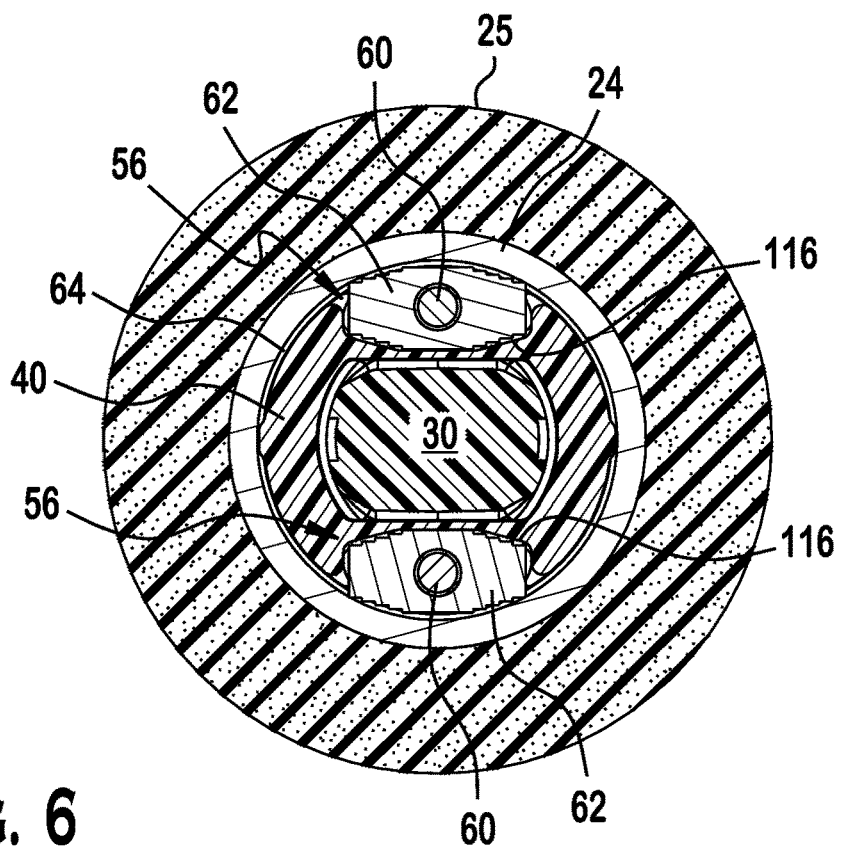
FIG. 6 is a cross-sectional view of the stock of FIG. 5 along line 6-6.
Figure 20:
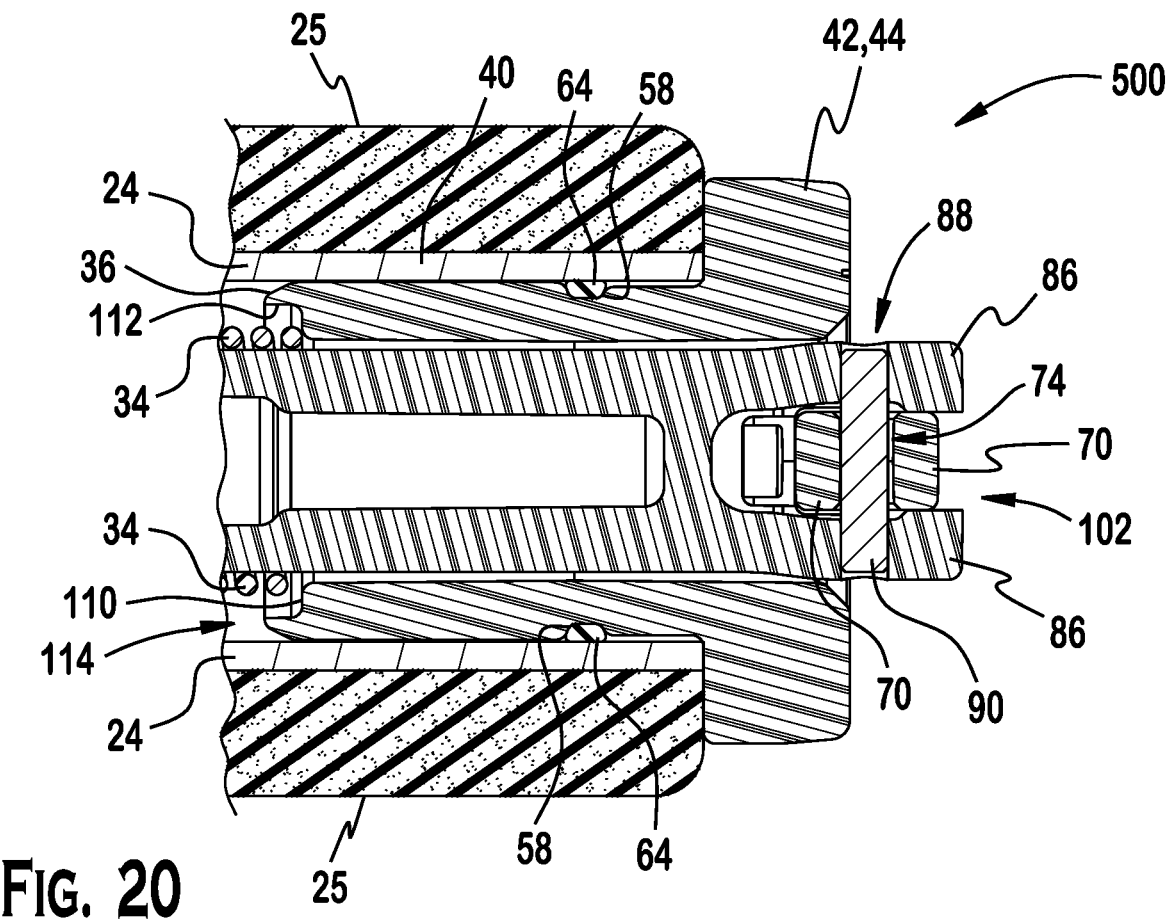
FIG. 20 is a cross-sectional view of the handlebar accessory of FIG. 19 along line 20-20.
Figure 21:
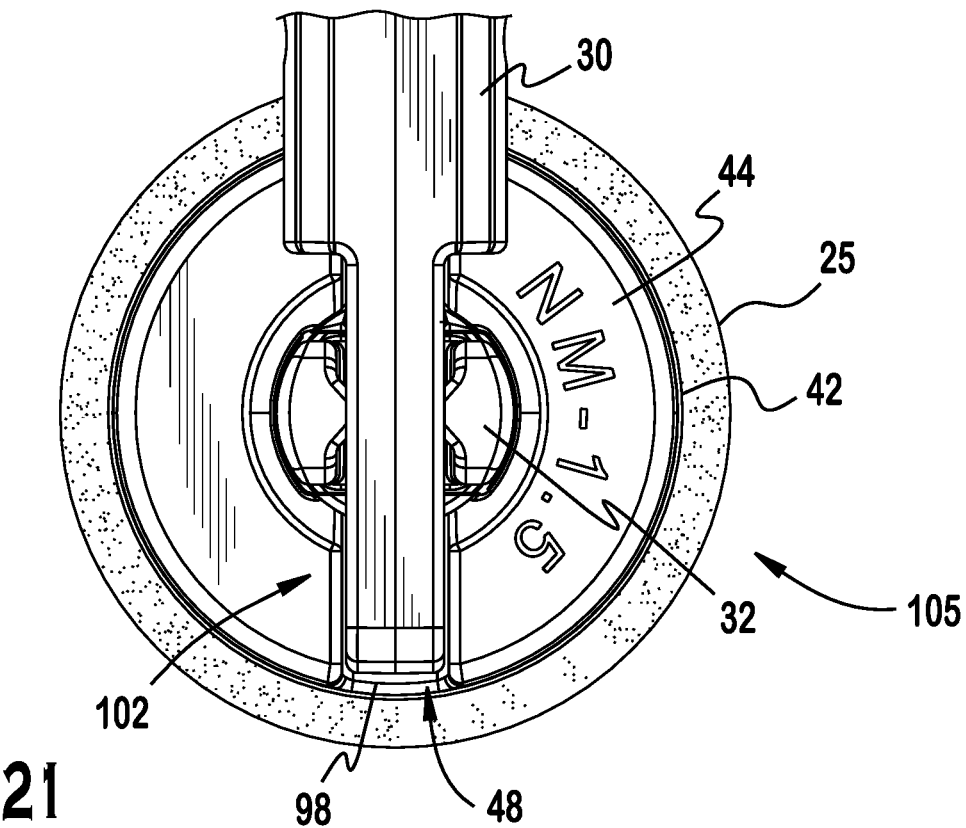
FIG. 21 is a front detail view of the handlebar accessory of FIG. 18.

Referring to FIGS. 5, 10 and 22, the main body 28 may include a proximal end 36 and a distal end 38, as well as a flange (or radial rim) 42 adjacent to the distal end 38 and a tubular plug 40 extending from the proximal end 36 to the flange 42. A passage 46 may extend from the distal end 38 to the proximal end 36 of the main body 28. Referring to FIG. 22, the passage 46 may have a longitudinal axis. As shown in FIG. 6 (see also, FIGS. 14-21), the passage 46 further may include a cross-section perpendicular to the longitudinal axis which is configured and dimensioned to receive and slidingly pass the distal shaft 30, the proximal shaft 32, and the joint 102 that connects the distal shaft 30 to the proximal shaft 32. Referring to FIGS. 11, 14, 15 and 22, the base 44 also may include a notch 48 which extends across the distal end 38 of the main body 28. The notch 48 may have a longitudinal axis which is transverse to the longitudinal axis of the passage 46. For example, the longitudinal axis of the notch 48 may be perpendicular to the longitudinal axis of the passage 46. Referring to FIGS. 16 and 17, the notch 48 may include a cross-section perpendicular to the longitudinal axis of the notch 48 which is configured and dimensioned to receive the stem 70 of the distal shaft 30. Referring to FIG. 20, adjacent to the proximal end 36 of the main body 28 the plug 40 further may include a planar surface 110 surrounding the passage 46. The planar surface 110 and an adjacent side wall 112 may form a superior spring seat 114 for the coil spring 34. The planar surface 110 may face the annular base 106 on the distal end of the carriage 92.

Figure 4:
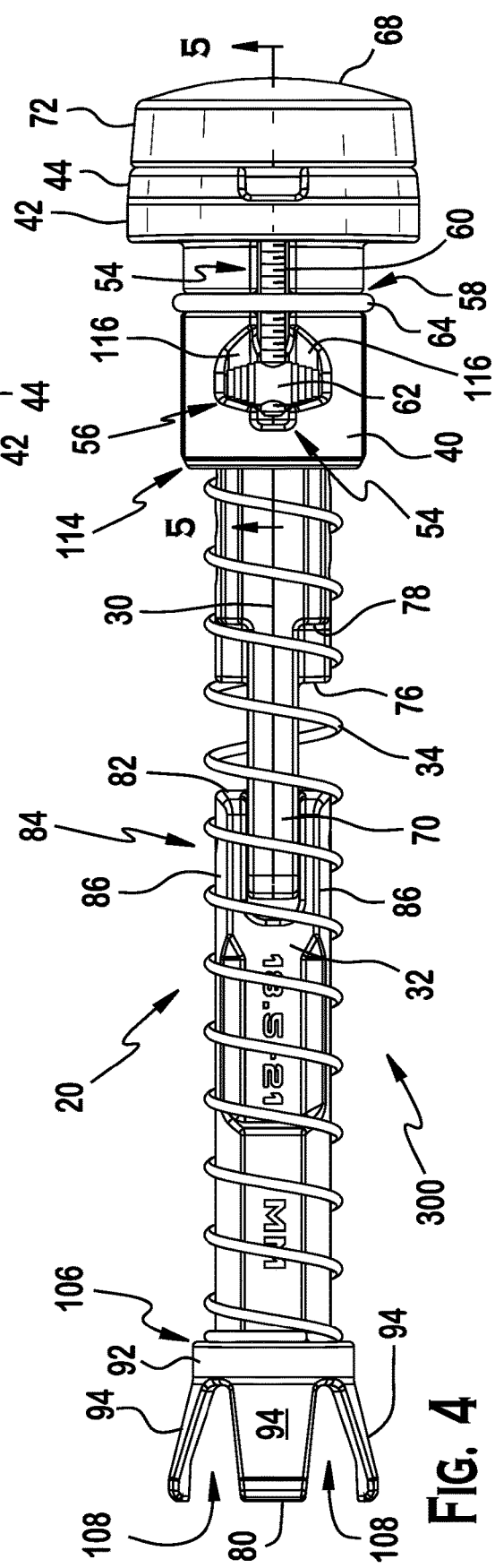
FIG. 4 is top view of the handlebar accessory of FIG. 1.
Figure 7:
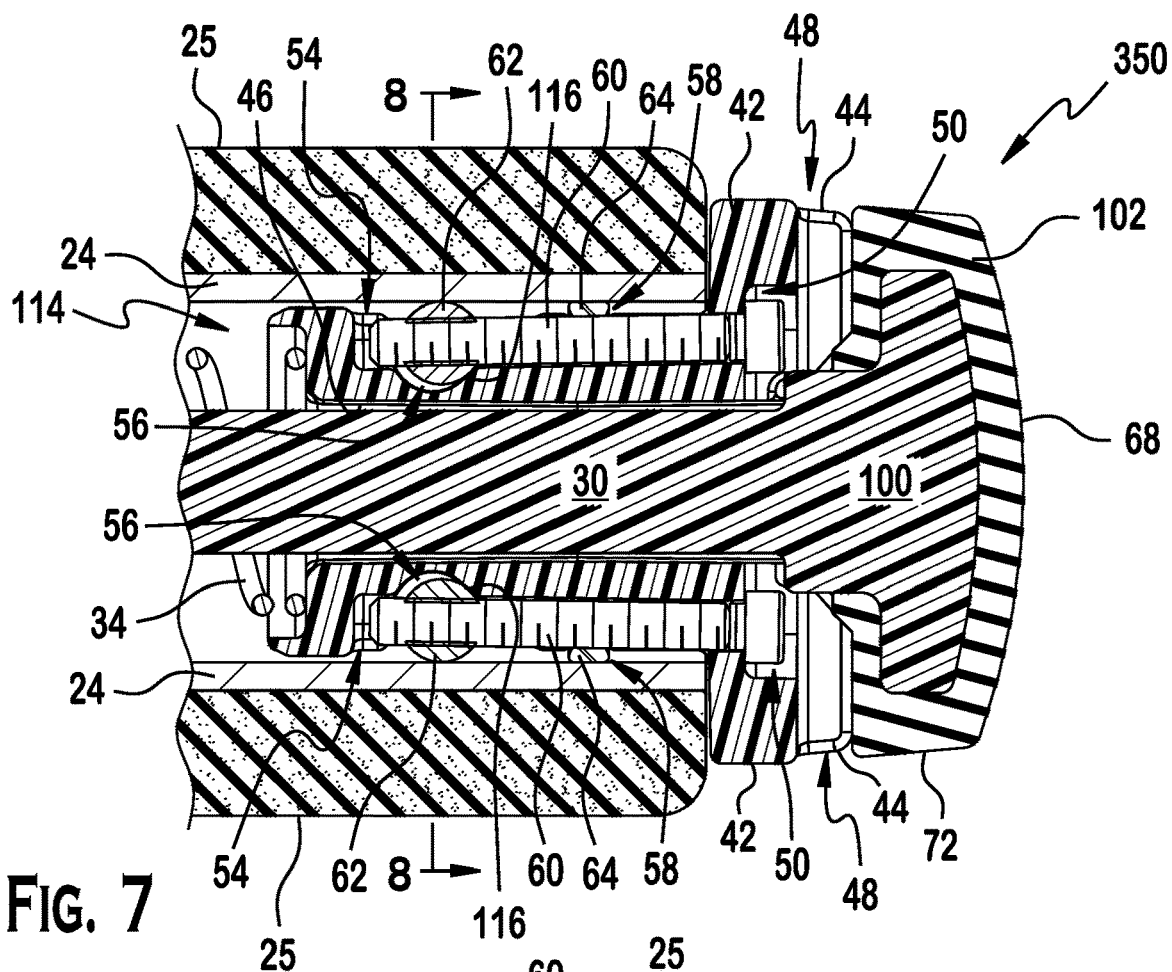
FIG. 7 is another view of FIG. 5 showing the handlebar accessory in a stowed configuration.
Figure 8:
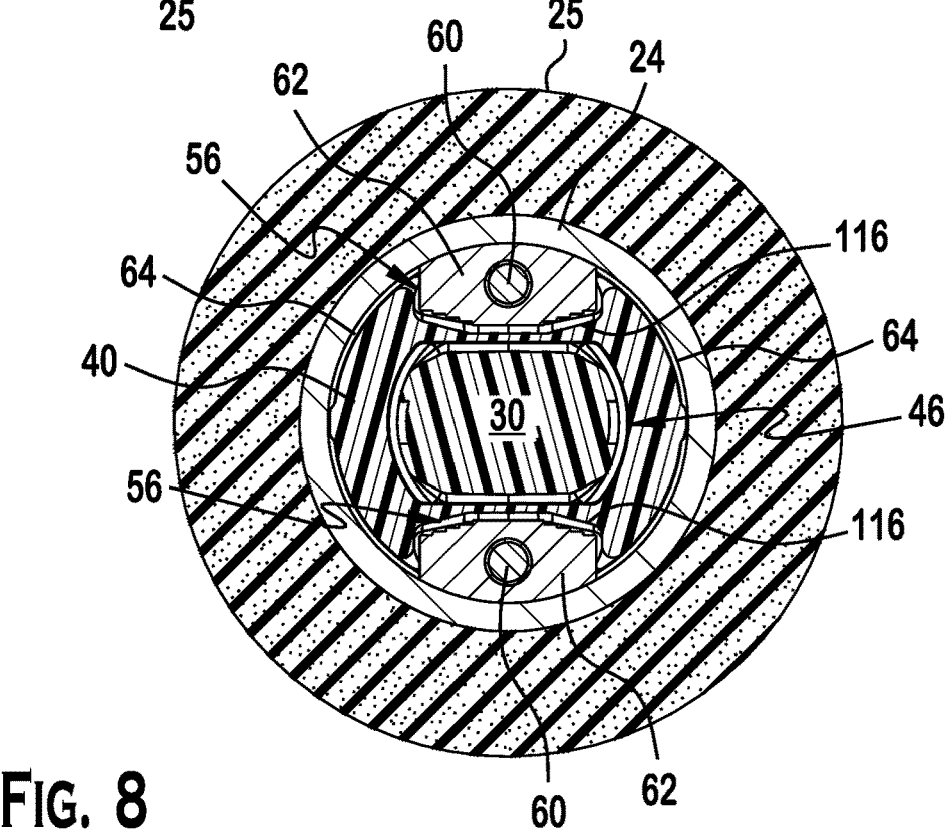
FIG. 8 is a cross-sectional view of the handlebar accessory of FIG. 7 along line 8-8.
Figure 9:
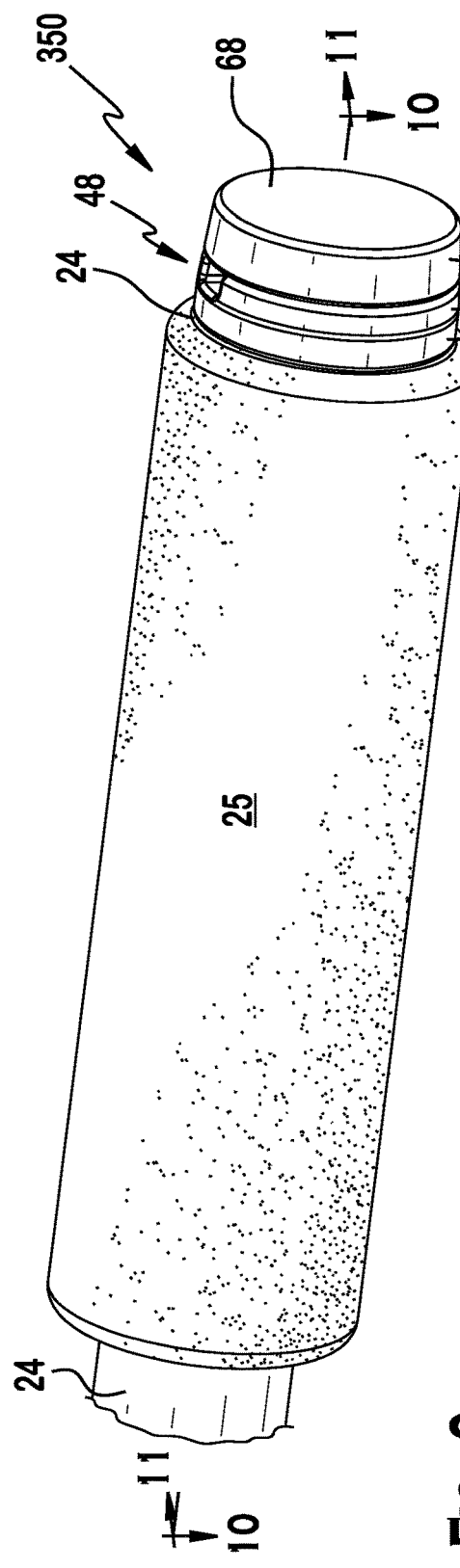
FIG. 9 is a detailed view of the handlebar and handlebar accessory of FIG. 1.

Referring to FIGS. 4, 7 and 8, the plug 400 may include a circumferential groove 58. The circumferential groove may be configured and dimensioned to receive an seal 64, for example, an O-ring. The O-ring 64 may be compressed between the plug 40 and the inner surface of the handlebar tube 24 when the bicycle pod 20 is positioned in the tube 24. The O-ring 64 may facilitate a structurally secure fit and watertight or water resistant connection between the bicycle pod 20 and the handlebar tube 24. Accordingly, the O-ring 64 and circumferential groove 58 may provide a secure interface between the bicycle pod 20 and the handlebar tube 24 that resists or suppresses relative moment (e.g., wiggling or vibration) and absorbs noise associated therewith (e.g., rattling). Preferably, the O-ring 64 may be formed of an elastomeric material. A sealing mechanism, however, other than an O-ring and circumferential groove may be used provided that a structurally secure fit and watertight or water resistant connection between the plug and the handlebar tube is achieved.

Referring to FIGS. 7 and 22, the notch 48 may include a recessed and countersunk fastener receiving hole 50 that extends through the flange 42 to a fastener recess 54 and an anchor recess 56 located on the outer surface of the plug 40. The anchor recess 56 may include a proximal end and a distal end. The anchor recess 56 further may include a bottom or inner surface. The depth of the recess may taper from the proximal end to the distal end. The anchor recess 56 may be deeper at the proximal end and shallower at the distal end, and thus the bottom or inner surface of the recess may form a ramp 116. See also, FIGS. 4 and 8. Also, the depth of the anchor recess may be greater along the longitudinal axis of the main body than the sides of the anchor recess.

Referring to FIGS. 6, 8 and 22, the anchor 62 may include a longitudinal axis and a bore 118 that includes a central axis. The bore 118 may extend through the anchor 62 such that the central axis of the bore 118 is perpendicular to the longitudinal axis of the anchor. The bore 118 further may include a screw thread. A threaded fastener 60 may be arranged in the countersunk fastener receiving hole 50 and then advanced through the threaded bore 118 of anchor 62.

As the threaded fastener 60 is rotated in one direction the anchor 62 may advance along the threaded fastener 60 toward the distal end of the anchor recess. Referring to FIGS. 7 and 8, as the anchor 62 advances toward the distal end of the anchor recess 56, the anchor 62 may advance up the ramp 116 which guides or displaces the anchor 62 outwardly to increase the maximum outer dimension of the plug 40. By contrast, as the threaded fastener 60 is rotated in the opposite direction the anchor 62 may advance along the threaded fastener 60 toward the proximal end of the anchor recess, thereby moving the anchor 62 down the ramp 116 and reducing the maximum outer dimension of the plug. See e.g., FIGS. 5 and 6.

Accordingly, as shown in FIGS. 5 and 6, the main body 28 may be arranged in the end of the handlebar tube 24 such that the inner surface of the handlebar tube 24 encloses the plug 40. The main body 28 may then be secured or fixed into the end of handlebar tube 24 by advancing each anchor 62 toward the distal end of the respective anchor recess 56 and pressing against the inner surface of the handlebar tube 24 to form a compression fitting with the handlebar tube 24. See e.g., FIGS. 7 and 8. By contrast, as the threaded fastener 60 is rotated in the opposite direction, the anchor 62 may advance along the threaded fastener 60 toward the proximal end of the anchor recess 56, thereby moving the anchor 62 down the ramp 116 and away from the inner surface of the handlebar tube 24, thereby reducing the maximum outer dimension of the plug 40 and disengaging the anchor 62 from the inner surface of handlebar tube 24 and releasing or unfixing the main body 28 from the handlebar tube. Thus, as shown in FIGS. 7-13, tightening the threaded fasteners may create an expansion fitting which locks the plug 40 into the bicycle handlebar tube 24; whereas, as shown in FIGS. 5 and 6, loosening the threaded fasteners 60 may unlock the plug 40 from the handlebar tube 24 by reducing the maximum outer dimension of the plug 40, as each respective threaded fastener 60 pushes the associated anchor 62 down the ramp 116 toward the bottom of the anchor recess 56.

Referring to FIGS. 3 and 4, the bicycle handlebar accessory (or bicycle pod) 20 may include a coil spring 34 disposed between the main body 28 and the carriage 92. The coil spring 34 may be arranged around the distal shaft 30 and the proximal shaft 32. One end of the coil spring 34 may be received on the superior spring seat 114 and the other end of the spring 34 may be received on the inferior spring seat 106 (see also, FIG. 5). As shown in FIGS. 9-13, the coil spring 34 may bias the knob 72 against the base (or gate) 44 of the main body 28. Also, the coil spring 34 may allow the knob 72 to be pulled away from the base 44 (see e.g., FIGS. 14 and 15) to allow the distal shaft 30 to be articulated as depicted in FIGS. 16 and 17. The distal shaft 30 may be seated between the notch 48 and the eye structure 84 (see e.g., FIGS. 18-20), in this configuration the lower shoulder 76 may rest on the proximal shaft 32, the upper shoulder 78 may rest on the flange 42 of the main body 28, and the compressed coil spring 34 may bias the stem 70 into the notch 48 to fix the distal shaft 30 to the main body 28.

Referring to FIGS. 10-12, the carriage 92 may be centrally positioned within the bicycle handlebar tube 24. For example, the leaves 94 on the carriage 92 may be compressed inwardly by the forces applied by the interior side wall of the handlebar tube 24 as the proximal end 80 of the bicycle handlebar accessory or bicycle pod 20 is positioned in the tube. Additionally, the leaves 94 may absorb or attenuate vibrations generated by a host bicycle during operation. Hence, the leaves 94 further may serve as an anti-rattle device.

Generally, the handlebar accessory (or bicycle pod) 20 may be formed from metal, metal alloys, wood, plastic, polymer materials, reinforced polymer materials, thermoplastic materials, and combinations thereof. For example, the main body 28, the distal shaft 30, and the proximal shaft 32 may be formed from a nylon polymer. Additionally, the knob 72 on the distal shaft 30 may include an elastomer exterior. Moreover, the coil spring 34 may be formed from spring steel, the threaded fasteners 60 may be formed from a steel alloy, and the anchors may be formed from polymer with metal inserts or from a metal alloy. For example, the anchors may be formed from stainless steel. Also, polymer components of the handlebar accessory 20 may be dimpled or designed to reduce weight and maintain structural integrity and strength. Additionally, the bicycle handlebar accessory may be adapted so as not to include a coil spring. Also, a secondary mechanical device (e.g., a latch) may be provided to further secure the distal shaft in the notch when the bicycle pod is in the deployed configuration. Further, the notch may be keyed to mate or interlock with the distal shaft when the distal shaft is seated in the notch. For example, the notch and the distal shaft may each possess a mating cross-sectional profile that is wedge shaped or T-shaped.

Figure 23:
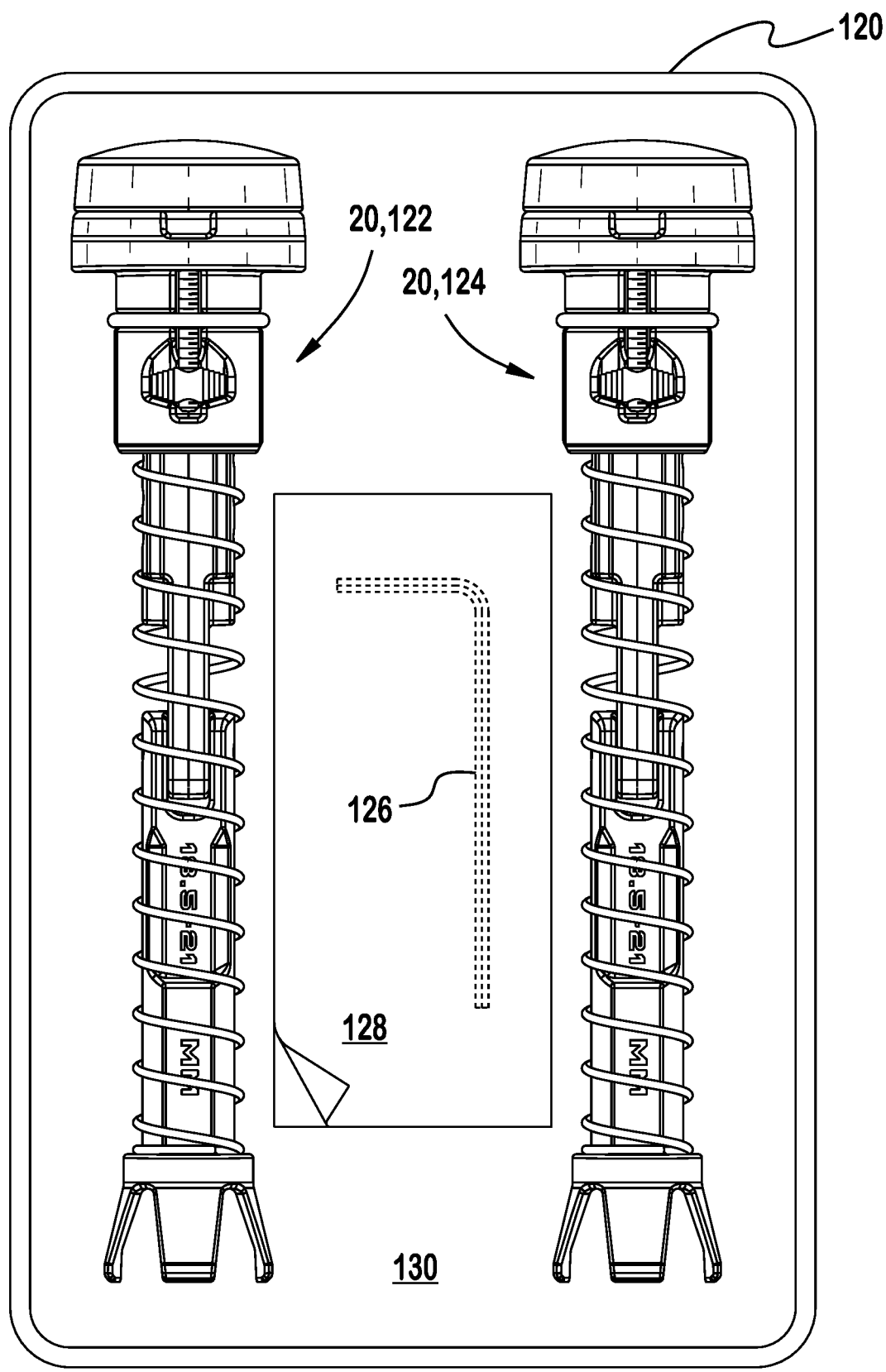
FIG. 23 is a bicycle handlebar accessory kit for stabilizing an inverted bicycle for inspection or repairs.

The handlebar accessory (or bicycle pod) 20 may be packaged individually with installation instructions and an installation tool or as a complete accessory kit for a bicycle. Referring to FIG. 23, an exemplary accessory kit 120 for a bicycle may provide a first handlebar accessory 122, a second handlebar accessory 124, and a tool (e.g., an Allen wrench) 126 for manipulating the threaded fasteners 60 of the respective handlebar accessories 122, 124, along with a set of installation instructions 128. The handlebar accessories 122, 124 may be shipped in the ready configuration 300. The kit may be packaged in a box or a sealed plastic container 130. The contents of the bicycle handlebar accessory kit 120 may be visible from outside the box or container 130. For instance, a box may include a cut out or window, and a sealed plastic container may be transparent.

In use, a handlebar accessory 20 may be positioned and secured inside a handlebar tube 24. This configuration may be referred to as a stowed configuration 350 (see e.g., FIG. 9). The stowed configuration may be achieved by inserting the proximal end of the handlebar accessory into a handlebar tube. The handlebar accessory may be rotated in the tube until the notch is vertically aligned and the hinged joint orientated to articulate and seat in an upward direction. The distal end of the knob may be pushed toward the handlebar until the flange is seated against the handlebar tube and grip. The knob may be withdrawn and lowered to reveal the upper threaded fastener. The upper threaded fastener may be rotated in a clockwise position while pushing the main body against the handlebar tube. The knob may then be raised to reveal the lower threaded fastener. The lower threaded fastener may be rotated in a clockwise position while pushing the main body against the handlebar tube. Once the main body is firmly installed in the handlebar tube, the upper threaded fastener and the lower threaded fastener may be tightened further to securely fix the bicycle handlebar accessory in the handlebar tube. In the stowed configuration, the knob may abut the base until the accessory is deployed. For example, the distal shaft, proximal shaft, and fastener may be telescopically received within the handlebar. Preferably, the distal shaft, proximal shaft and fastener assembly may be spring loaded. For example, the distal shaft, proximal shaft and fastener assembly may be connected to one side of a coil spring that is anchored inside the handlebar such that a pulling force must be applied to the knob to telescopically withdraw the distal shaft, proximal shaft and fastener assembly from the passage in the base and handlebar tube. This configuration may be referred to as an extended configuration 400 (see e.g., FIGS. 14 and 15). After the distal shaft, proximal shaft and fastener assembly are withdrawn from the passage in the base, the distal shaft may be articulated toward the notch. This may be referred to as an articulated configuration (see e.g., FIGS. 16 and 17). Once articulated, the distal shaft may be pushed downward until the upper shoulder is fully seated in the notch and the lower shoulder is resting against the proximal shaft. This may be referred to as the deployed configuration (see e.g., FIGS. 18 and 19).

When a handlebar accessory 20 associated with the right handlebar grip and a handlebar accessory 20 associated with the left handlebar grip are each in the deployed configuration 500, the distal surface of the knob may form a stable area for interfacing with the ground. An operator may then invert a bicycle with two handlebar accessories in the deployed configuration such that the bicycle saddle and the two knobs of the respective handlebar accessories may contact the ground to form a tripod for supporting the bicycle in an upright but inverted position (see e.g., FIG. 2), which may be referred to as a repair configuration 200. In the repair configuration, the handlebar accessories and the handlebar may form a bipod that elevates the handlebar and any accessories or equipment that are mounted to the handlebar away from the ground. Hence, the bicycle 10 may be inverted for repair or inspection without resting expensive equipment (e.g., a bike computer, cell phone, GPS, etc.) on the ground, and thus prevent valuable or sensitive equipment from being scratched, damaged, or otherwise placed near potentially damaging elements (e.g., sand, gravel, water, mud, pavement, heat or cold from the pavement, salt or chemical road treatments). After inspection or repair of the bicycle 10, the operator may restore the bicycle 10 to an upright configuration (see e.g., FIG. 1). Each handlebar accessory 20 may be retracted from the deployed configuration 500 to the stowed configuration 350 by pushing up on the tip of the stem, until the distal shaft unseats and articulates away from the base. The coil spring may bias the carriage away from the plug, drawing the distal shaft into the passage until the knob is seated against the base.

While it has been illustrated and described what at present are considered to be preferred embodiments of the present invention, it will be understood by those skilled in the art that various changes and modifications may be made, and equivalents may be substituted for elements thereof without departing from the true scope of the invention. For example, the shape or materials of construction of the component's (e.g., the anchors) may be adapted for use with handlebars of a particular geometry or material. Additionally, features and or elements from any embodiment may be used singly or in combination with other embodiments. Therefore, it is intended that this invention not be limited to the particular embodiments disclosed herein, but that the invention include all embodiments falling within the scope and the spirit of the of following claims.

The invention claimed is:

1. A handlebar accessory for a bicycle comprising:
   a distal shaft including a first longitudinal axis, the distal shaft comprising
      a knob,
      a stem spaced from the knob along the first longitudinal axis, the stem comprising a first side surface, a second side surface spaced from the first side surface, and an elongated slot extending from the first side surface to the second side surface, and
      an intermediate segment disposed between the knob and the stem;
   a proximal shaft including a second longitudinal axis and comprising a shoulder, a carriage spaced from the shoulder along the second longitudinal axis, and a plurality of resilient cantilevered appendages extending from the carriage; and
   a main body disposed between the knob and the carriage, the main body including a third longitudinal axis and comprising
      a proximal end,
      a flange spaced from the proximal end along the third longitudinal axis,
      a base adjacent to the flange, the base comprising a notch which includes a fourth longitudinal axis, the fourth longitudinal axis being transverse to the third longitudinal axis,
      a plug disposed between the proximal end and the flange; and
      a passage extending from the proximal end to the base, the passage bisecting the notch and comprising a first cross-sectional profile perpendicular to the third longitudinal axis,
   wherein the proximal shaft and the distal shaft are linked, and the handlebar accessory comprises a first configuration and a second configuration such that in the first configuration the knob is adjacent to the base, and the intermediate segment is disposed in the passage, and in the second configuration the proximal shaft is disposed in the passage, the intermediate segment rests on the base, and the stem is disposed in the notch and spans the passage.

2. The handlebar accessory of claim 1, wherein in the second configuration the plug and shoulder block relative movement of the proximal shaft through the passage.

3. The handlebar accessory of claim 2, wherein the notch further comprises a first side wall adjacent to the flange, and a second side wall adjacent to the flange, and further wherein in the second configuration the first side wall and the second side wall prevent movement of the distal shaft transverse to the first longitudinal axis.

4. The handlebar accessory of claim 3, wherein in the second configuration the stem, the proximal shaft, and the notch cooperate to prevent rotation of the distal shaft about a fifth longitudinal access, the fifth longitudinal axis being perpendicular to the first longitudinal axis and the second longitudinal axis.

5. The handlebar accessory of claim 1, wherein the intermediate segment comprises a third side surface, a fourth side surface spaced from the third side surface, a third sidewall disposed adjacent to the elongated slot which extends from the third side surface to the second side surface, and a fourth sidewall spaced from the third sidewall along the second longitudinal axis, the fourth sidewall extending from the third side surface to the second side surface, the third sidewall forming a lower shoulder, and the fourth sidewall forming an upper shoulder.

6. The handlebar accessory of claim 5, wherein in the second configuration the upper shoulder rests on the base.

7. The handlebar accessory of claim 1, further comprising a coil spring disposed between the carriage and the plug.

8. The handlebar accessory of claim 7, wherein the coil spring biases the carriage away from the plug.

9. The handlebar accessory of claim 8, wherein the coil spring biases the knob toward the main body.

10. The handlebar accessory of claim 8, wherein the coil spring biases the stem into the notch.

11. The handlebar accessory of claim 1, further comprising:
   an eye structure on the proximal shaft, the eye structure including a first arm which comprises a first fastener receiving hole, and a second arm which comprises a second fastener receiving hole; and
   a hinge pin;
   wherein the stem is disposed between the first arm and the second arm, and the hinge pin is arranged in the first fastener receiving hole, the elongated slot, and the second fastener receiving hole.

12. The handlebar accessory of claim 1, wherein the plug further comprises a circumferential groove.

13. The handlebar accessory of claim 12, wherein the plug further comprises an O-ring disposed in the circumferential groove.

14. The handlebar accessory of claim 1, wherein the plug further comprises a fastener recess and an anchor recess adjacent to the fastener recess.

15. The handlebar accessory of claim 14, wherein the anchor recess comprises an inner surface, and the inner surface is a ramp.

16. The handlebar accessory of claim 15, further comprising a threaded fastener in the fastener recess, and an anchor comprising a threaded bore in the anchor recess, the threaded fastener being advanced through the threaded bore to selectively position the anchor within the anchor recess, the anchor contacting the ramp and projecting outside of the anchor recess.

17. The handlebar accessory of claim 1, wherein the knob comprises an elastomeric exterior.

18. A bicycle pod apparatus comprising:
   a bicycle comprising a handlebar tube including a first open end and a second open end; and
   a first handlebar accessory of claim 1 secured in the first open end of the handlebar tube.

19. The bicycle pod apparatus of claim 18, further comprising a second handlebar accessory of claim 1 secured in the second open end of the handlebar tube.

20. A method of stabilizing a bicycle for repairs above the ground, the bicycle including a saddle and a handlebar tube having a first open end and a second open end, the method comprising:
   providing a first handlebar accessory of claim 1,
   securing the first handlebar accessory of claim 1 in the first open end of the handlebar tube,
   arranging the first handlebar accessory of claim 1 in a first deployed configuration,
   providing a second handlebar accessory of claim 1,
   securing the second handlebar accessory of claim 1 in the second open end of the handlebar tube,
   arranging the second handlebar accessory of claim 1 in a second deployed configuration, and
   inverting the bicycle such that the first handlebar accessory of claim 1, the second handlebar accessory of claim 1, and the saddle contact the ground to stabilize the bicycle for repairs and hold the handlebar tube away from the ground.

\* \* \* \* \*